United States Patent
Rosén et al.

(10) Patent No.: US 11,971,177 B2
(45) Date of Patent: Apr. 30, 2024

(54) CONTROL UNIT AND METHOD FOR CONTROLLING A LOCAL DISTRIBUTION SYSTEM'S OUTTAKE OF HEAT OR COLD FROM A THERMAL ENERGY DISTRIBUTION GRID

(71) Applicant: EMG Energimontagegruppen AB, Karlshamn (SE)

(72) Inventors: Per Rosén, Lund (SE); Jacob Skogström, Lomma (SE); Fredrik Rosenqvist, Helsingborg (SE)

(73) Assignee: EMG ENERGIMONTAGEGRUPPEN AB, Karlshamn (SE)

( * ) Notice: Subject to any disclaimer, the term of this patent is extended or adjusted under 35 U.S.C. 154(b) by 302 days.

(21) Appl. No.: 16/958,154

(22) PCT Filed: Dec. 20, 2018

(86) PCT No.: PCT/EP2018/086047
§ 371 (c)(1),
(2) Date: Jun. 26, 2020

(87) PCT Pub. No.: WO2019/129603
PCT Pub. Date: Jul. 4, 2019

(65) Prior Publication Data
US 2020/0363072 A1    Nov. 19, 2020

(30) Foreign Application Priority Data
Dec. 27, 2017  (EP) .................................. 17210622

(51) Int. Cl.
*F24D 10/00*  (2022.01)
*G05D 23/19*  (2006.01)
*F24F 110/10* (2018.01)

(52) U.S. Cl.
CPC ........ *F24D 10/003* (2013.01); *F24D 2200/12* (2013.01); *F24F 2110/10* (2018.01); *F24F 2221/54* (2013.01); *G05D 23/1934* (2013.01)

(58) Field of Classification Search
None
See application file for complete search history.

(56) References Cited

U.S. PATENT DOCUMENTS

2011/0098869 A1*  4/2011  Seo ...................... H04L 41/0833
                                                    700/296
2012/0215362 A1*  8/2012  Stagner .................. G06Q 10/00
                                                    700/278
(Continued)

FOREIGN PATENT DOCUMENTS

EP    2664864 A1 * 11/2013    .......... F24F 11/0012
EP    3199875 A1    8/2017
(Continued)

OTHER PUBLICATIONS

International Search Report and Written Opinion dated Apr. 17, 2019 for PCT/EP2018/086047 filed on Dec. 20, 2018, 11 pages.

*Primary Examiner* — Jennifer L Norton
(74) *Attorney, Agent, or Firm* — XSENSUS LLP

(57) ABSTRACT

A method for controlling a local distribution system's outtake of heat or cold from a thermal energy distribution grid. The method includes determining a base steering temperature for the local distribution system's outtake of heat from the thermal energy distribution grid, receiving a control signal indicative of reducing the steering temperature for the local distribution system's outtake of heat from the thermal energy distribution grid; determining a reduced steering temperature for the local distribution system's outtake of heat from the thermal energy distribution grid based on the control signal and the base steering temperature; determining a return temperature of a heat transfer fluid in the return,
(Continued)

and upon the determined reduced steering temperature being lower than the return temperature, determining a temporary steering temperature higher than the return temperature and lower than the base steering temperature; and controlling the local distribution system's heat outtake based on the temporary steering temperature.

8 Claims, 7 Drawing Sheets

(56) References Cited

U.S. PATENT DOCUMENTS

| | | | |
|---|---|---|---|
| 2014/0214227 A1* | 7/2014 | Thornton | H02J 9/062 |
| | | | 700/295 |
| 2016/0172854 A1* | 6/2016 | Zhou | H02J 3/28 |
| | | | 700/291 |
| 2020/0088227 A1* | 3/2020 | Stapleton | F16B 12/125 |
| 2020/0363074 A1* | 11/2020 | Rosén | G06Q 50/06 |
| 2021/0088227 A1* | 3/2021 | Rosén | F24D 19/1006 |
| 2021/0341167 A1* | 11/2021 | Rosen | G05D 23/1934 |
| 2023/0213212 A1* | 7/2023 | Lindoff | F24D 10/00 |
| | | | 237/8 R |

FOREIGN PATENT DOCUMENTS

| | | | | |
|---|---|---|---|---|
| EP | 3825614 A1 * | 5/2021 | | F24D 10/003 |
| EP | 3885657 A1 * | 9/2021 | | |
| EP | 3901525 A1 * | 10/2021 | | |
| WO | 2007/136344 A1 | 11/2007 | | |
| WO | 2010/087759 A1 | 8/2010 | | |
| WO | WO-2012020205 A1 * | 2/2012 | | F24D 19/1015 |
| WO | WO-2012074478 A1 * | 6/2012 | | F24D 19/1066 |
| WO | 2017/076868 A1 | 5/2017 | | |
| WO | WO-2018007235 A1 * | 1/2018 | | F24D 10/00 |
| WO | WO-2021064628 A1 * | 4/2021 | | F24F 11/62 |

* cited by examiner

CONTROL UNIT AND METHOD FOR CONTROLLING A LOCAL DISTRIBUTION SYSTEM'S OUTTAKE OF HEAT OR COLD FROM A THERMAL ENERGY DISTRIBUTION GRID

CROSS-REFERENCE TO RELATED APPLICATIONS

The present application is based on PCT filing PCT/EP2018/086047, filed Dec. 20, 2018, which claims priority to EP 17210622.1, filed Dec. 27, 2017, the entire contents of each are incorporated herein by reference.

FIELD OF INVENTION

The invention relates to methods for controlling a local distribution system's outtake of heat or cold from a thermal energy distribution grid. The invention also relates to a control unit for controlling a local distribution system's outtake of heat or cold from a thermal energy distribution grid.

TECHNICAL BACKGROUND

Nearly all large developed cities in the world have at least two types of energy distribution grids incorporated in their infrastructures: one grid for providing heating and one grid for providing cooling. The grid for providing heating may e.g. be used for providing comfort and/or process heating, and/or hot tap water preparation. The grid for providing cooling may e.g. be used for providing comfort cooling and/or process cooling.

A common grid for providing heating is a gas grid or an electrical grid providing comfort and/or process heating, and/or hot tap water preparation. An alternative grid for providing heating is a district heating grid. The district heating grid is used for providing heated heat transfer fluid, typically in the form of water, to buildings of the city. A centrally placed heating and pumping plant is used for heating and distributing the heated heat transfer fluid. The heated heat transfer fluid is delivered to the buildings via one or more feed conduits and is returned to the heating and pumping plant via one or more return conduits. Locally at a building, heat from the heated heat transfer fluid is extracted via a district heating substation comprising a heat exchanger.

A common grid for providing cooling is the electrical grid. The electricity may e.g. be used for running refrigerators or freezers or for running air conditioners for providing comfort cooling. An alternative grid for providing cooling is a district cooling grid. The district cooling grid is used for providing cooled heat transfer fluid, typically in the form of water, to buildings of the city. A centrally placed cooling and pumping plant is used for cooling and distributing the thus cooled heat transfer fluid. The cooled heat transfer fluid is delivered to the buildings via one or more feed conduits and is returned to the cooling and pumping plant via one or more return conduits. Locally at a building, cold from the cooled heat transfer fluid is extracted via a heat pump.

The use of energy for heating and/or cooling is steadily increasing, influencing the environment negatively. By improving utilization of the energy distributed in the energy distribution grids, negative influences on the environment may be reduced. Hence, there is a need for improving utilization of the energy distributed in energy distribution grids, including existing grids. Provision of heating/cooling also requires huge investments when it comes to engineering projects and there is a constant strive to cut the costs. Hence, there is a need for improvements in how to provide sustainable solutions to heating and cooling of a city.

SUMMARY OF INVENTION

It is an object of the present invention to solve at least some of the problems mentioned above. Hence, according to a first aspect a method for controlling a local distribution system's outtake of heat from a thermal energy distribution grid is provided. According to a second aspect a method for controlling a local distribution system's outtake of cold from a thermal energy distribution grid is provided. Preferred embodiments appear in the dependent claims and in the description.

The local distribution system comprises a device for exchange of thermal energy between the local distribution system and the thermal energy distribution grid, and one or more thermal energy distribution devices. The local distribution system further comprises a feed for feeding the one or more thermal energy distribution devices with thermal energy from the device for exchange of thermal energy by conducting a heat transfer fluid, and a return for returning the heat transfer fluid from the one or more thermal energy distribution devices to the device for exchange of thermal energy.

The method according to the first aspect comprises determining a base steering temperature for the local distribution system's outtake of heat from the thermal energy distribution grid. The method further comprises receiving, at the local distribution system, a control signal indicative of reducing the steering temperature for the local distribution system's outtake of heat from the thermal energy distribution grid, and determining a reduced steering temperature for the local distribution system's outtake of heat from the thermal energy distribution grid based on the control signal and the base steering temperature. The method further comprises determining a return temperature of the heat transfer fluid in the return, and upon the determined reduced steering temperature being lower than the return temperature, determining a temporary steering temperature being higher than the return temperature and lower than the base steering temperature. The local control unit may be controlling the local distribution system's outtake of heat from the distribution grid based on the temporary steering temperature.

The method according to the second aspect comprises determining a base steering temperature for the local distribution system's outtake of cold from the thermal energy distribution grid. The method further comprises receiving, at the local distribution system, a control signal indicative of increasing the steering temperature for the local distribution system's outtake of cold from the thermal energy distribution grid and determining an increased steering temperature for the local distribution system's outtake of cold from the thermal energy distribution grid based on the control signal and the base steering temperature. The method further comprises, determining a return temperature of the heat transfer fluid in the return, upon the determined increased steering temperature being higher than the return temperature, determining a temporary steering temperature being lower than the return temperature and higher than the base steering temperature, and controlling the local distribution system's outtake of cold from the distribution grid based on the temporary steering temperature.

Usually, multiple buildings are connected to a distribution grid at different distances from a production plant providing heated and/or cooled fluid to the grid. A building close to the production plant on the grid may therefore use more than its share of heat or cold, which may lead to buildings further away on the grid do not get sufficient heating or cooling when there are limited supplies of heated or cooled fluid. The outtake of heat or cold from the distribution grid may be controlled by local control units. A local control unit for a local distribution system may determine a base steering temperature for the local distribution system's outtake of heat or cold from the thermal energy grid. The local control unit may receive a control signal indicating a change in the steering temperature, for example an increase or a decrease. The local control unit may determine a reduced or increased temporary steering temperature based on the received control signal and the base steering temperature and control the local distribution system's outtake of heat or cold with the reduced or increased steering temperature. In this way, the local distribution system's outtake of heat or cold may be partly controlled via a control signal received by the local control unit. This control signal may, for example, be sent by a central system or server with information that the energy consumption in the system should be lowered. In this way the risk for overloading the whole distribution system may be decreased.

In the methods according to the first and second aspects a temporary steering temperature may be determined. The temporary steering temperature may be determined based on the return heat transfer fluid, i.e. the temperature may be based on how much heat or cold was used by the local distribution system. It has been realized that setting a steering temperature lower (or higher in case of a system for cold) than the return temperature would be equivalent to fully stopping the outtake, for example, by fully closing a valve of the system, thereby causing wear on the valve. By instead using a temporary steering temperature, the wear on the valve may be decreased, as the change may be performed gradually.

When setting a (temporary) steering temperature lower than the previous steering temperature, the return temperature of the local distribution system may be lowered or increased, for systems for heat or cold respectively, after some time. When the return temperature has been affected by the change in the steering temperature, the temporary steering temperature may be further changed. This allows for the temporary steering temperature to stay above (or below) the return temperature while decreasing (or increasing) the steering temperature. The steering temperature may in this way be gradually increased or decreased.

A local control unit may directly change the steering temperature to the desired value without taking the return temperature into account. This may however lead to wear on the local distribution system, as to reach a determined steering temperature in the local distribution, a control valve may have to be closed for a period of time. This solution has the risk of being interpreted by persons in the building as that the system is malfunctioning, which may have lead them to contact the distributor. In contrast, by determining a steering temperature higher or lower than the return temperature, depending on if the system is for heat or cold, the control valve may not have to be fully closed, thereby avoiding any confusion of users of the local distribution system. Further, it will protect the control valve from malfunctioning, since repeated fully closing and subsequent opening of the control valve may induce wear to the control valve.

It will be appreciated that the term "thermal energy distribution system" relates any system for distributing thermal energy. For example, it may relate to a system for distributing heat or a system for distributing cold. According to another example, it may relate to a combined system for distributing both heat and cold. A "distribution grid" may be any means for distributing heat and/or cold in the thermal energy distribution system via a feed of a heat transfer fluid to a building or system.

A "local distribution system" is a system for distribution of heat and/or cold from the thermal energy distribution grid. It may comprise a device for exchanging energy between the thermal energy distribution grid and the local distribution system.

It will be appreciated that a "local control unit" may be any type of processing unit adapted for controlling a local distribution system. A local control unit may be used for one or a plurality of local distribution systems.

A "thermal energy distribution device" may be any device for transferring thermal energy to or from the local thermal energy distribution system into the building with which the device is associated.

By "outtake" is meant the local distribution system's consumption or use of heat or cold from the thermal energy distribution grid.

The "control signal" may be any signal for communicating a change in a steering temperature for the local control unit. It may, for example, be an analog or a digital signal.

I will be appreciated that the terms "heat" or "cold" is interpreted as energy for changing a temperature in a building, either by increasing or decreasing the temperature.

By controlling local control units via a central server the outtake of heat or cold in the whole thermal distribution system may be adapted accordingly. The controlling may be based on a capacity limit of a production plant configured to provide heat and/or cold to the thermal energy distribution grid. This may decrease the risk of overloading the production plant, or not being able to provide enough heat or cold for all the buildings on the grid.

However, it has also been realized that changing a local distribution system's outtake of heat or cold from the thermal distribution system may cause wear on the local distribution system. For example, to reach a determined steering temperature in the local distribution, a control valve may have to be closed for a period of time. In contrast, in the present disclosure, the steering temperature may be determined based on the return temperature of the local distribution system. By adapting the temporary steering temperature to the return temperature, the temporary steering temperature may be kept low enough to cause a decrease (or increase in case of a system for cold) in the return temperature decreases, but high (or low) enough to avoid fully closing a valve of the system. In this way, the outtake of the local energy distribution system may be decreased while minimizing the wear on the system components such as control valves and/or pumps. Further, as discussed above, the risk of persons in the building being serviced by the being interpreting the local energy distribution system being as malfunctioning is minimized.

The method according to the first aspect may further comprise to over time determining the return temperature, and gradually decreasing the temporary steering temperature while securing that the temporary steering temperature is greater than the return temperature, until the temporary steering temperature reaches the reduced steering temperature.

Correspondingly, the method according to the second aspect may further comprise to over time determining the return temperature, and gradually increasing the temporary steering temperature while securing that the temporary steering temperature is lower than the return temperature, until the temporary steering temperature reaches the increased steering temperature.

By securing that the temporary steering temperature is greater than the return temperature, closing of the valve regulating the temperature may be avoided, as heat or cold is continually transported to the local distribution system. By gradually decreasing the temporary steering temperature, the desired steering temperature may be reached without unnecessary wear on the local distribution system.

According to an embodiment of the first aspect, the act of gradually decreasing the temporary steering temperature may comprise to, until the temporary steering temperature reaches the reduced steering temperature, over time determining a return temperature, and in response to the determined return temperature reaching the temporary steering temperature, determining the return temperature of the return of heat transfer fluid in the local distribution system, and determining a new temporary steering temperature being higher than the determined return temperature and lower than the previous temporary According to an embodiment of the method of the second aspect, the act of gradually increasing the temporary steering temperature may comprise to, until the temporary steering temperature reaches the increased steering temperature, over time determining a return temperature, and in response to the determined return temperature reaching the temporary steering temperature, determining the return temperature of the return of heat transfer fluid in the local distribution system, and determining a new temporary steering temperature being lower than the determined return temperature and higher than the previous temporary steering temperature.

The act of determining a return temperature may be performed periodically. Periodically may be interpreted as performed regularly with a time interval. For example, the determination may be performed every minute, every five minutes, every fifteen minutes, or another suitable time interval.

By over time determining the return temperature, the temporary steering temperature may be adjusted when the return temperature changes. In this way, the steering temperature may be adjusted relatively fast as it follows the decrease of the return temperature.

This gradual increase or decrease may be controlled based on a return temperature of the local distribution system, for example, the difference between the return temperature and the steering temperature may be kept at a fixed value. In this way, the temperature may be gradually increased until the steering temperature reaches the desired value.

The method according to the first aspect may further comprise determining a temperature outside a building in which the local distribution system is arranged, wherein the act of determining the base steering temperature for the local distribution system's outtake of heat from the thermal energy distribution grid may be based on the determined temperature outside the building.

The method according to the second aspect may further comprise determining a temperature inside a building in which the local distribution system is arranged, wherein the act of determining the base steering temperature for the local distribution system's outtake of cold from the thermal energy distribution grid is based on the determined temperature outside the building.

For example, if the temperature is relatively high, the outtake of heat may be decreased or the outtake of cold may be increased. Alternatively, if the temperature is relatively low, the outtake of heat may be increase or the outtake of cold may be decreased. Each local control unit may be adapted to determine if the temperature is relatively high or relatively low and control the associated local distribution system accordingly.

By adapting the local distribution system's outtake to the temperature outside or inside the building, the outtake of the local distribution system may be more precisely adapted to the need of the building. Further, by not consuming more heat or cold than is needed, the outtake of heat or cold may be more energy efficient and thereby keep costs relatively low.

According to a third aspect of the invention, a control unit for controlling a local distribution system's outtake of heat from a thermal energy distribution grid is provided.

The local distribution system is equivalent to the local distribution system described with reference to the first and second aspects.

The control unit may comprise a first receiver configured to receive data pertaining to a base steering temperature for the local distribution system's outtake of heat from the thermal energy distribution grid, a second receiver configured to receive a control signal indicative of reducing the steering temperature for the local distribution system's outtake of heat from the thermal energy distribution grid and a third receiver configured to receive data pertaining to a return temperature of the heat transfer fluid in the return. The control unit may further comprise a steering temperature controlling module configured to control a steering temperature for the local distribution system's outtake of heat from the thermal energy distribution grid by determining a reduced steering temperature for the local distribution system's outtake of heat from the thermal energy distribution grid based on the control signal and the base steering temperature, comparing the reduced steering temperature and the return temperature. Upon the determined reduced steering temperature being lower than the return temperature, the temperature controlling module may determine a temporary steering temperature being higher than the return temperature and lower than the base steering temperature, and setting the temporary steering temperature as the steering temperature for the local distribution system's outtake of heat from the thermal energy distribution.

According to a fourth aspect of the invention, a control unit for controlling a local distribution system's outtake of cold from a thermal energy distribution grid.

The local distribution system is equivalent to the local distribution system described with reference to the first and second aspects.

The control unit may comprise a first receiver configured to receive data pertaining to a base steering temperature for the local distribution system's outtake of cold from the thermal energy distribution grid, a second receiver configured to receive a control signal indicative of increasing the steering temperature for the local distribution system's outtake of cold from the thermal energy distribution grid, and a third receiver configured to receive data pertaining to a return temperature of the heat transfer fluid in the return. The control unit may further comprise a steering temperature controlling module configured to control a steering temperature for the local distribution system's outtake of cold from the thermal energy distribution grid by determining an increased steering temperature for the local distribution system's outtake of cold from the thermal energy distribution grid based on the control signal and the base steering temperature, comparing the increased steering temperature and the return temperature, and upon the determined increased steering temperature being higher than the return temperature, determining a temporary steering temperature being lower than the return temperature and higher than the base steering temperature. The steering temperature control module may further be configured to set the temporary steering temperature as the steering temperature for the local distribution system's outtake of cold from the thermal energy distribution.

The control units according to the third and fourth aspects of the invention may have the same effect and solve the same problems as the methods according to the first and second aspects described above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention and as defined in the claims will become apparent to those skilled in the art from this detailed description. It will also be appreciated that embodiments and aspects may be combined advantageously. For example, the method of the first aspect may be combined with the method of the second aspect. Similarly, the control unit of the third aspect may be combined with the control unit if the fourth aspect.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The invention will by way of example be described in more detail with reference to the appended schematic drawings, which shows a presently preferred embodiment of the invention.

All figures are schematic, not necessarily to scale, and generally only show parts which are necessary in order to elucidate the embodiments, wherein other parts may be omitted.

DETAILED DESCRIPTION

Detailed embodiments of the present inventive concept will now be described with reference to the drawings. The present inventive concept, may, however, be embodied in many different forms and should not be construed as limited to the embodiments set forth herein; rather, these embodiments are provided by way of example so that this disclosure will convey the scope of the inventive concept to those skilled in the art.

Figure 1:
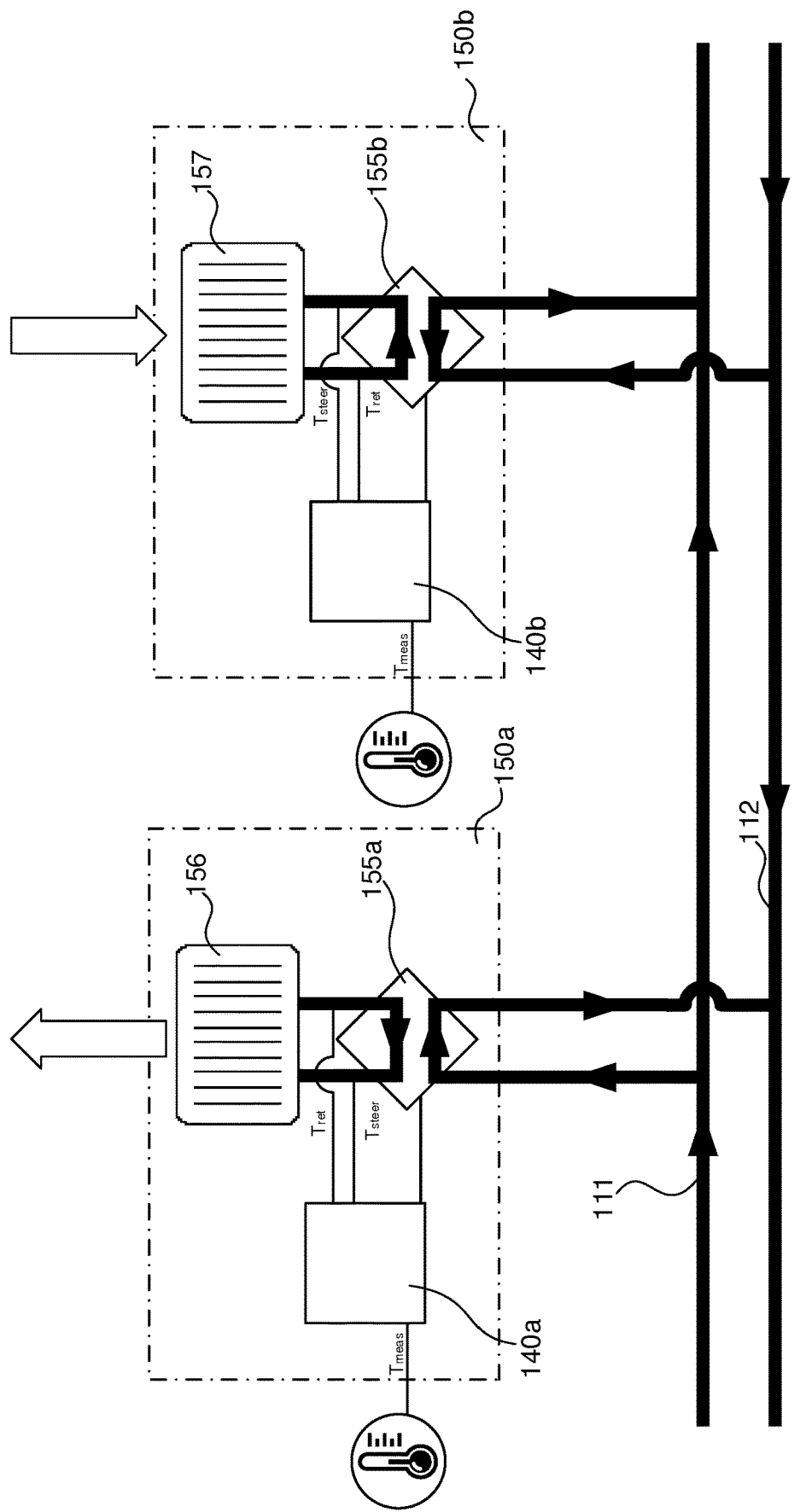
FIG. 1 is a schematic diagram of two local distribution systems.

Two examples of a local distribution systems 150a, 150b will now be described with reference to FIG. 1. The local distribution systems 150a, 150b may be arranged in buildings such as office buildings, business premises, residential homes, factories or other buildings in need for heat or cold.

The local distribution system 150a is configured to distribute heat in a building. The heat may be in form of comfort heating, hot tap water and/or any other heating need of a building. The local distribution system 150b is configured to distribute cold in a building. The cold may be comfort cooling, cooling for refrigeration or freezing purposes, and/or any other cooling need of a building.

The local distribution systems 150a, 150b may be arranged in one and the same building. Alternatively, the local distribution systems 150a, 150b may be arranged in different buildings.

The local distribution system 150a comprises a local control unit 140a, a device 155a configured to exchange thermal energy between the local distribution system 150a and a thermal energy distribution grid 110 and a heat emitter 156. In the in FIG. 1 shown example the device 155a configured to exchange thermal energy between the local distribution system 150a and the thermal energy distribution grid 110 is a heat exchanger. However, device 155a configured to exchange thermal energy between the local distribution system 150a and the thermal energy distribution grid 110 may instead be a heat pump. The use of a heat exchanger or heat pump is depending on the temperature of the heat transfer fluid in the thermal energy distribution grid 110 and the wanted temperature of the heat transfer fluid of the local distribution system 150a. Via the device 155a configured to exchange thermal energy between the local distribution system 150a and the thermal energy distribution grid, heat from the thermal energy distribution grid 110 is distributed to the local distribution system 150a. Heat may thereafter be emitted to the building wherein the local distribution system 150a is located via the heat emitter 156. The local distribution system 150a may comprise one or more heat emitters 156. The local control unit 140a is configured to control the associated local distribution system's 150a outtake of heat from the thermal energy distribution grid 110. The local control unit 140a is adapted to receive a control signal from, for example, a central server and to control the associated local distribution system's 150a outtake of heat from the thermal energy distribution grid 110 according to the received control signal. The local control unit 140a is configured to control the associated local distribution system's 150a outtake of heat from the thermal energy distribution grid 110 by controlling a valve regulating a flow of heat transfer fluid from the thermal energy distribution grid 110 to flow through the device 155a configured to exchange thermal energy between the local distribution system 150a and the thermal energy distribution grid. The valve is not explicitly disclosed in FIG. 1 but it is forming part of the device 155a configured to exchange thermal energy between the local distribution system 150a and the thermal energy distribution grid. The valve may be implemented as a flow valve. The valve may be implemented as a pump. The function of the valve is to regulate the flow of heat transfer fluid of the thermal energy distribution grid 110 through the device 155a configured to exchange thermal energy between the local distribution system 150a and the thermal energy distribution grid.

The local distribution system 150b comprises a local control unit 140b, a device 155b configured to exchange thermal energy between the local distribution system 150b and the thermal energy distribution grid 110 and a heat absorber 157. In the in FIG. 1 shown example the device 155b configured to exchange thermal energy between the local distribution system 150b and the thermal energy distribution grid 110 is a heat exchanger. However, device 155b configured to exchange thermal energy between the local distribution system 150b and the thermal energy distribution grid 110 may instead be a heat pump. The use of a heat exchanger or heat pump is depending on the temperature of the heat transfer fluid in the thermal energy distribution grid 110 and the wanted temperature of the heat transfer fluid of the local distribution system 150b. Via the device 155b configured to exchange thermal energy between the local distribution system 150b and the thermal energy distribution grid 110, cold from the thermal energy distribution grid is distributed to the local distribution system 150b. Heat may thereafter be absorbed from the building wherein the local distribution system 150b is located via the heat absorber 157. The local distribution system 150b may comprise one or more heat absorbers 157. The local control unit 140b is configured to control the associated local distribution system's 150b outtake of cold from the thermal energy distribution grid 110. The local control unit 140b is adapted to receive a control signal from, for example, a central server and to control the associated local distribution system's 150b outtake of cold from the thermal energy distribution grid according to the received control signal. The local control unit 140b is configured to control the associated local distribution system's 150b outtake of cold from the thermal energy distribution grid 110 by controlling a valve regulating a flow of heat transfer fluid from the thermal energy distribution grid 110 to flow through the device 155b configured to exchange thermal energy between the local distribution system 150b and the thermal energy distribution grid. The valve is not explicitly disclosed in FIG. 1 but it is forming part of the device 155b configured to exchange thermal energy between the local distribution system 150b and the thermal energy distribution grid. The valve may be implemented as a flow valve. The valve may be implemented as a pump. The function of the valve is to regulate the flow of heat transfer fluid of the thermal energy distribution grid 110 through the device 155b configured to exchange thermal energy between the local distribution system 150b and the thermal energy distribution grid.

The local control unit 140a, 140b control the local distribution system's 150a, 150b outtake of heat or cold from the thermal energy distribution grid 110 via a steering signal $T_{steer}$. The local control unit 140a, 140b or the local distribution system 150a, 150b may comprise a PID-controller to control an outtake from the thermal energy distribution grid 110 via the device 155a, 155b configured to exchange thermal energy between the local distribution system 150a, 150b and the thermal energy distribution grid 110.

The local control unit 140a, 140b may be configured to determine a temperature $T_{mes}$ and decrease, increase, or keep constant the local distribution system's 150a, 150b outtake of heat or cold from the grid 110 based on the determined temperature. In the case of the local distribution system 150a being a system for emitting heat into the building $T_{mes}$ is typically determined just outside the building wherein the local distribution system 150a is located. In the case of the local distribution system 150b being a system for absorbing heat from the building $T_{mes}$ is typically determined inside the building.

A sensor may be arranged to sense a return temperature $T_{res}$ of heat transfer fluid entering the device 155b configured to exchange thermal energy between the local distribution system 150a, 150b and the thermal energy distribution grid 110. The sensor may be connected to the local control unit 140a, 140b associated with the local distribution system 150a, 150b.

Figure 6:
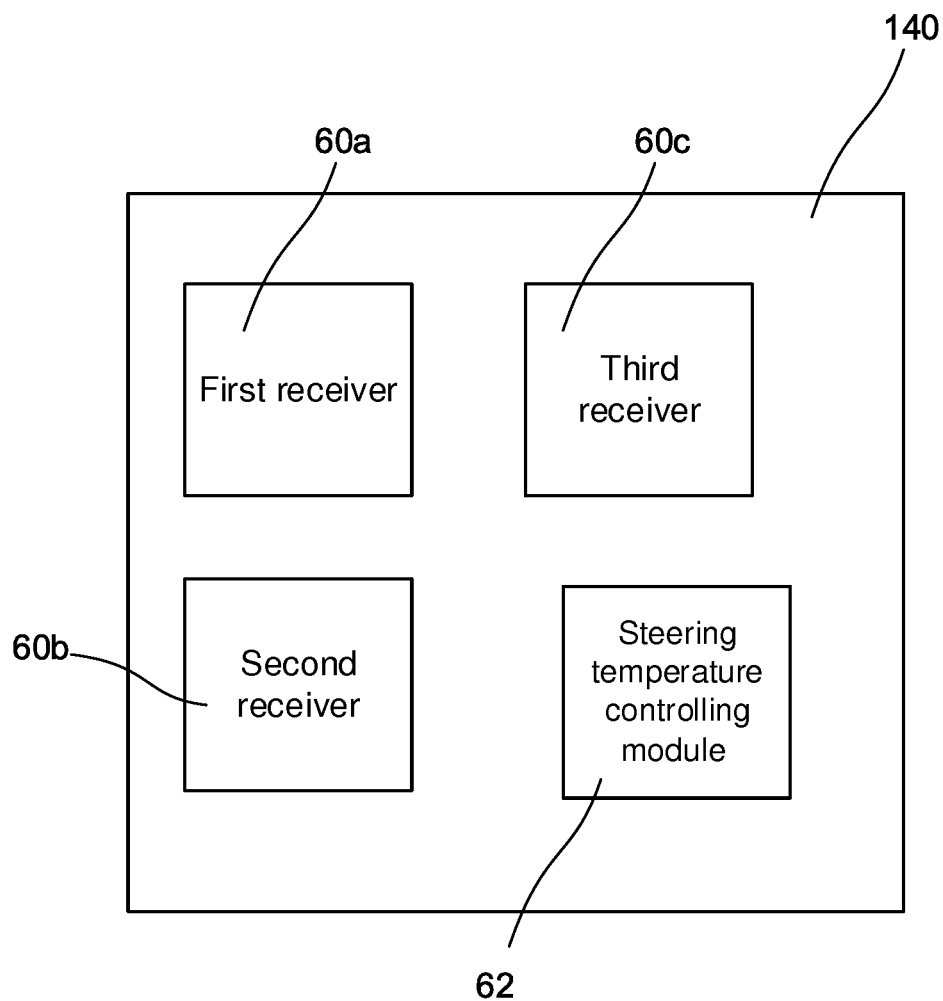
FIG. 6 is a schematic diagram of a control unit.

As illustrated in FIG. 6 the local control unit 140 comprises a first receiver 60a configured to receive data pertaining to a base steering temperature for the local distribution system's outtake of heat or cold from the thermal energy distribution grid. Such data may, for example, be determined by a thermometer outside or inside a building. The local control unit 140 further comprises a second receiver 60b configured to receive a control signal indicative of increasing, decreasing or keeping constant the steering temperature for the local distribution system's outtake of heat or cold from the thermal energy distribution grid. The control signal may be any type of control signal, for example a digital signal sent from a central server. The local control unit further comprises a third receiver 60c configured to receive data pertaining to a return temperature of the heat transfer fluid in the return of the local distribution system, for example, as determined by the sensor described above. The first, second and third receivers 60a, 60b, 60c may be different receivers. Any one of the first, second and third receivers 60a, 60b, 60c may be the same receiver.

Figure 3:
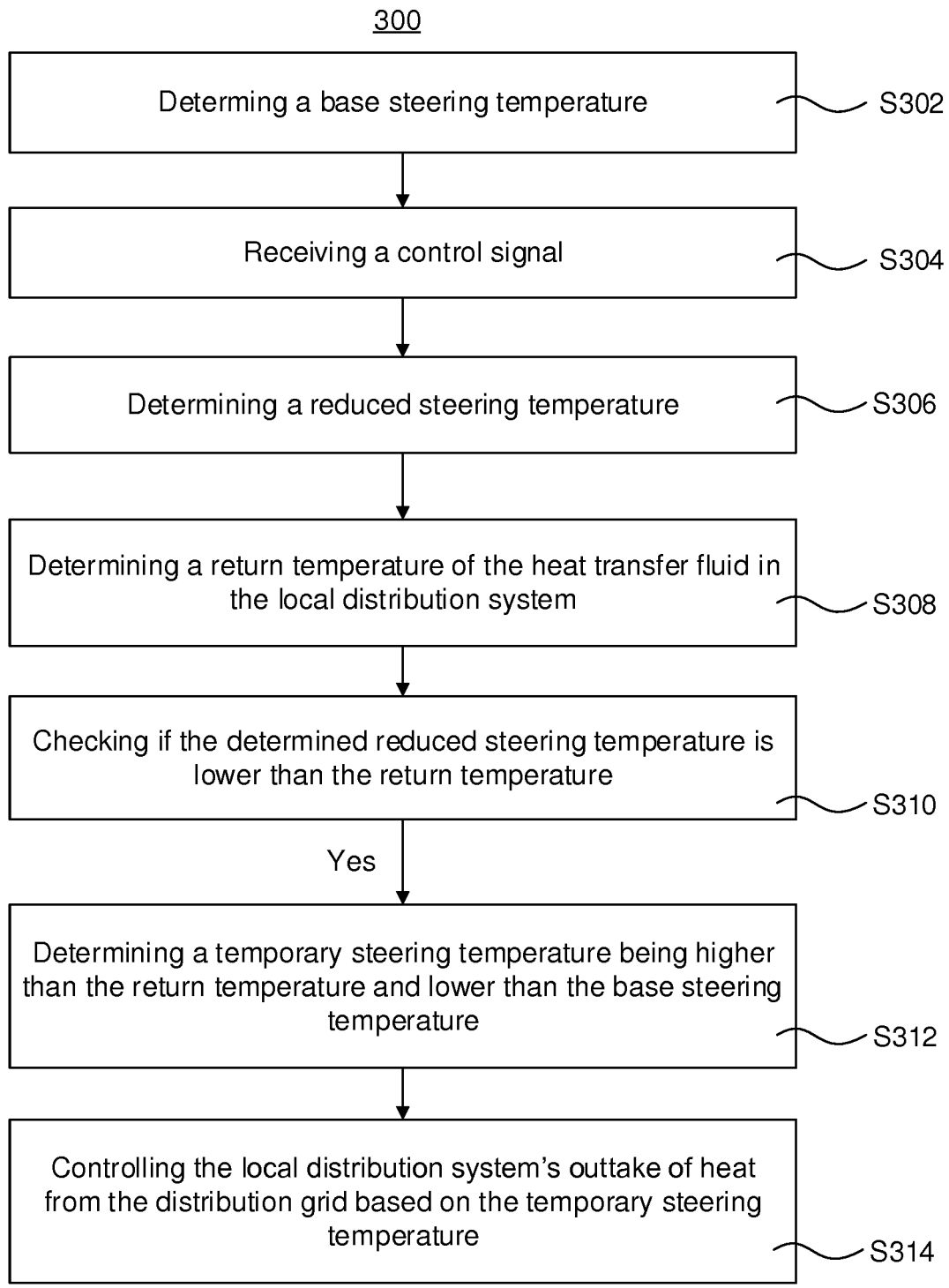
FIG. 3 is a flow diagram of a method for controlling a local distribution system's outtake of heat from a thermal energy distribution grid.
Figure 4:
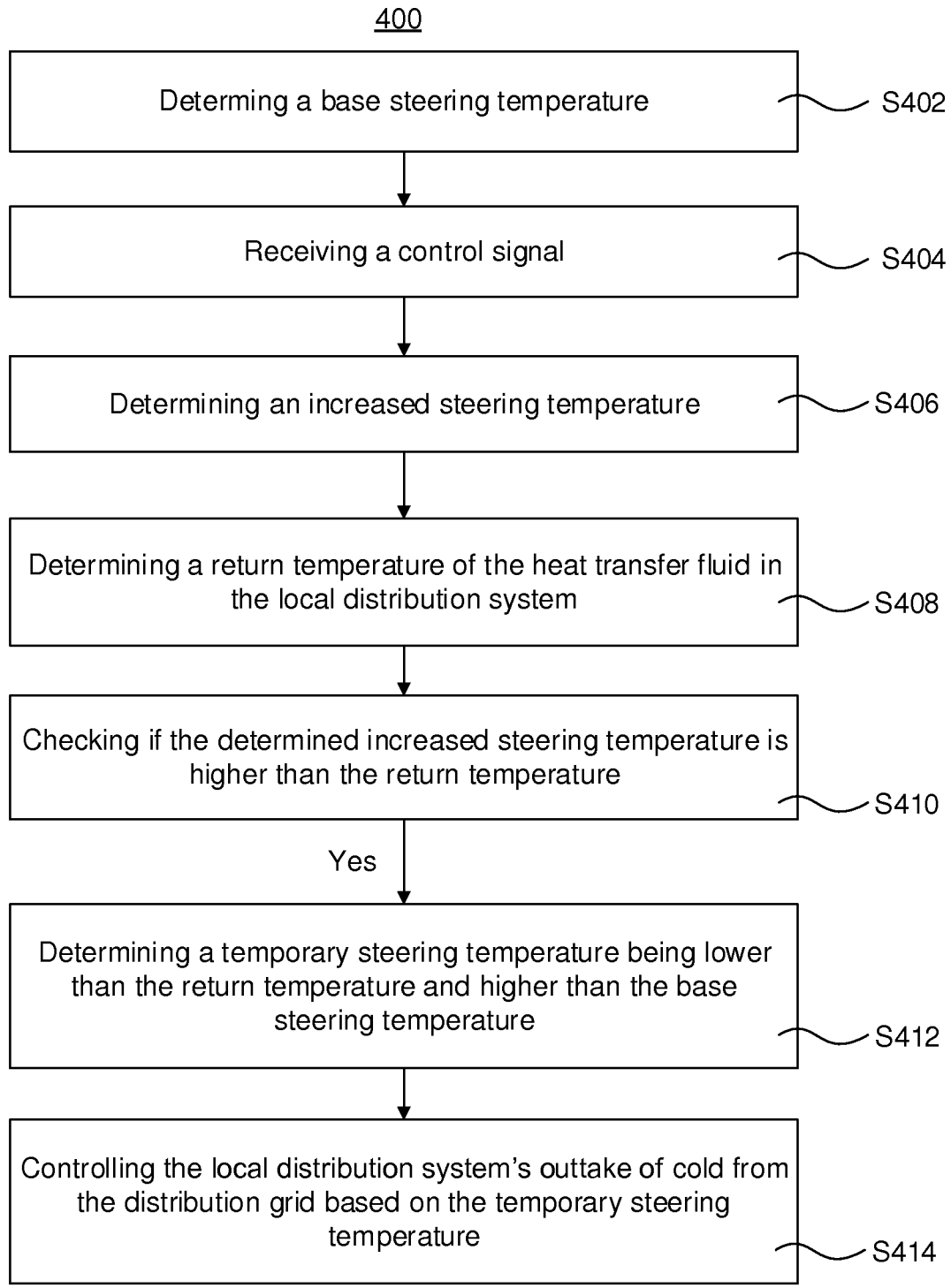
FIG. 4 is a flow diagram of a method for controlling a local distribution system's outtake of cold from a thermal energy distribution grid.

The local control unit further comprises a steering temperature controlling module 62 configured to control a steering temperature for the local distribution system's outtake of heat and/or cold from the thermal energy distribution grid, for example, by performing any one of the methods 300 or 400 described with reference to FIG. 3 and FIG. 4. The steering temperature controlling module 62 may be implemented as a dedicated hardware unit. Alternatively, the steering temperature controlling module 62 may be implemented as software code portions executed on a processing unit. Yet alternatively, part of the steering temperature controlling module 62 may be implemented as one or more dedicated hardware unit and part of the steering temperature controlling module 62 may be implemented as software code portions executed on a processing unit. The steering temperature controlling module 62 may further comprise a memory for storing data to be used in performing any one of the methods 300 or 400.

Figure 2:
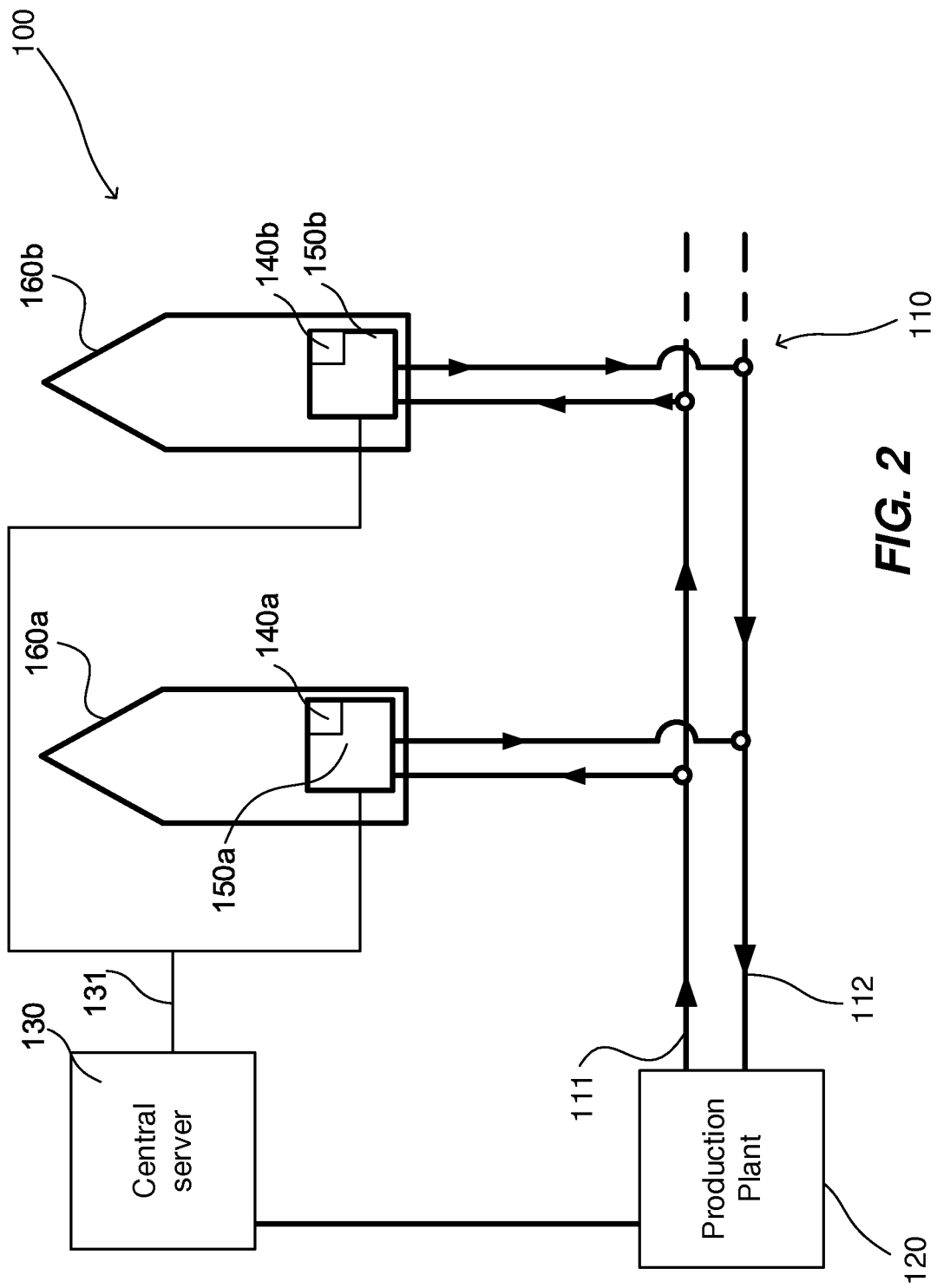
FIG. 2 is a schematic diagram of a thermal distribution system comprising local distribution systems.

An example of a thermal distribution system 100 comprising local distribution systems 150a, 150b is schematically illustrated in connection with FIG. 2. The thermal distribution system comprises a thermal energy distribution grid 110 for fluid based distribution of heat and/or cold and a production plant 120 for producing heat or cold and for delivering the heat or cold to the thermal energy distribution grid 110. The thermal distribution system also comprises a plurality of local control units 140a, 140b, each associated with a local distribution system 150a, 150b in a building 160a, 160b. In the in FIG. 2 shown example two local control units 140a, 140b, each associated with a local distribution system 150a, 150b in a building 160a, 160b are shown. It is however contemplated that any number of local control units may be used. Further, each local control unit may be configured to control a local distribution system for one or more buildings.

The local distribution systems 150a, 150b are connected with the thermal energy distribution grid 110 such that heat and/or cold may be exchanged between the thermal energy distribution grid 110 and the respective local distribution system 150a, 150b. The exchange of heat and/or cold between the thermal energy distribution grid 110 and the respective local distribution system 150a, 150b may be made using a heat exchanger. Alternatively, the exchange of heat and/or cold between the thermal energy distribution grid 110 and the respective local distribution system 150a, 150b may be made using heat pump.

The thermal energy distribution grid 110 may be formed by a hydraulic network that deliver a heat transfer fluid. The heat transfer fluid is typically water, although it is to be understood that other fluids or mixture of fluids may be used. Some non-limiting examples are ammonia, anti-freezing liquids (such as glycol), oils and alcohols. A non-limiting example of a mixture is water with an anti-freezing agent, such as glycol, added thereto.

The local distribution systems 150a, 150b may be arranged in buildings 160a, 160b such as office buildings, business premises, residential homes, factories or other buildings in need for heat or cold.

The production plant 120 is configured to heat or cool the heat transfer fluid of the thermal energy distribution grid 110. The heated or cooled heat transfer fluid may be transported via a feed conduit 111. Return heat transfer fluid may be transported via a return conduit 112 to the production plant 120. In the case of the heated heat transfer fluid is transported via the feed conduit 111 and cooled heat transfer fluid is returned via the return conduit 112 the thermal energy distribution grid 110 may be considered as a district heating grid. In the case of the cooled heat transfer fluid is transported via the feed conduit 111 and heated heat transfer fluid is returned via the return conduit 112, the thermal energy distribution grid 110 may be considered as a district cooling grid. According to another embodiment the thermal energy distribution grid 110 may be a district thermal energy distribution system as disclosed in WO 2017/076868. In such case the feed conduit 111 may be considered to be the hot conduit disclosed in WO 2017/076868 and the return conduit 112 may be considered to be the cold conduit disclosed in WO 2017/076868.

The local distribution system 150a, 150b is configured to distribute heat or cold to the building 160a, 160b. The local distribution system may distribute heat or cold in the building via a heat transfer fluid. The heat transfer fluid is typically water, although it is to be understood that other fluids or mixture of fluids may be used. Some non-limiting examples are ammonia, anti-freezing liquids (such as glycol), oils and alcohols. A non-limiting example of a mixture is water with an anti-freezing agent, such as glycol, added thereto. The local control unit 140a, 140b is configured to control the associated local distribution system's 150a, 150b outtake of heat or cold from the thermal energy distribution grid 110. The heat transfer fluid of the local distribution system 150a, 150b is typically not in fluid connection with the heat transfer fluid of the thermal energy distribution grid 110. As mentioned above, the distribution system 150a, 150b is thermally connected to the thermal energy distribution grid 110 via a heat exchanger or a heat pump.

The thermal distribution system 100 further comprises a central server 130. The central server 130 is connected to the production plant 120 and to the respective local control units 140a, 140b. The central server 130 may be any type of server comprising a processing unit. The central server 130 may physically comprise one single server device. Alternatively, the central server 130 may be distributed over several server devices. The central server 130 may be comprised in a production plant 120, or at any other suitable location. The central server 130 is configured to communicate with the production plant 120. The central server may communicate with the production plant 120, for example, via a dedicated network, over the Internet, or a combination thereof. The central server 130 is further configured to communicate with the local control units 140a, 140b, for example, via a dedicated network, over the Internet or a combination thereof. The communication in the dedicated network or the Internet may be wireless and/or wired.

The central server 130 may be configured to determine a capacity limit of the production plant 120. Further, the central server 130 may be configured to determine and a current or forecasted capacity for the production plant 120. The central server 130 may further be configured to send a control signal 131 to at least one of the plurality of local control units 140a, 140b.

The local control unit 140a, 140b may be configured to, in response to a control signal from the central server 130, decrease increase or keep constant the local distribution system's 150a, 150b outtake of heat or cold from the thermal energy distribution grid 110.

A method 300 for controlling a local distribution system's outtake of heat from a thermal energy distribution grid is described with reference to FIG. 3.

The method 300 comprises determining S302 a base steering temperature for the local distribution system's outtake of heat from the thermal energy distribution grid. The base steering temperature is a temperature controlling the distribution system's 150 outtake of heat from the thermal energy distribution grid 110. The base steering temperature may be a set-point temperature for the heat transfer fluid. The base steering temperature may be determined based on a temperature measured in and/or in vicinity to the building to which the heat is provided. For example, the local control unit 140 may determine a temperature $T_{mes}$. $T_{mes}$ may be determined outside of the building with which it is associated. Alternatively, $T_{mes}$ may be determined inside the building. Alternatively, the base steering temperature may be determined based on a temperature measured inside the building and a temperature measured outside the building.

The method 300 further comprises receiving S304 a control signal indicative of reducing the steering temperature for the local distribution system's outtake of heat from the thermal energy distribution grid. The control signal is received at the local distribution system, preferably by the local control unit 140. The control signal may, for example, be a temperature offset. The offset may be an actual temperature value with which the local control unit should regulate the outtake from the thermal energy distribution grid. The actual value may be a positive or negative value. The offset may be a percentage value to be applied to the current or calculated outtake. The offset may be determined according to the inertia of each building combined with the need to steer their aggregated need of effect connected to production units. Larger offset to handle larger steering needs and smaller offset to handle smaller steering needs.

The method 300 further comprises determining S306 a reduced steering temperature for the local distribution system's outtake of heat from the thermal energy distribution grid. The reduced steering temperature is determined based on the control signal and the base steering temperature. As mentioned above, the control signal is preferably received at the local control unit 140. The local control unit 140 may adjust the associated local distribution system's 150 outtake of heat from the thermal energy distribution grid 110 based on the control signal. For example, the local control unit 140 may regulate the base steering temperature based on an offset received via the control signal. If the control signal indicates a temperature value, the local control unit 140 may apply the value on the steering temperature, or if the control signal indicates a percentage value the local control unit 140 may apply the percentage on the steering temperature. For example, the offset may be added or subtracted from the base steering temperature. The local control unit 140 may thereby determine S306 a reduced steering temperature. The reduced steering temperature may be used until another control signal is received. The outtake of the local distribution system 150 may be regulated accordingly.

The method 300 further comprises determining S308 a return temperature of the heat transfer fluid in the return of the local distribution system. Hence, the return temperature of a return of heat transfer fluid in the local distribution system 150 is determined.

The method 300 further comprises checking S310 if the determined reduced steering temperature is lower than the return temperature. Upon the determined reduced steering temperature being lower than the return temperature, the method further comprises determining S312 a temporary steering temperature being higher than the return temperature and lower than the base steering temperature. Hence, when heat is taken out from the thermal energy distribution grid 110, the local control unit 140 may be configured to check S310 if the determined reduced steering temperature is lower than the return temperature. If the reduced steering temperature is lower than the return temperature, the local control unit 140 may be configured to determine S312 a temporary steering temperature that is higher than the return temperature and lower than the base steering temperature. Thereby the local distribution system's 150 outtake of heat may be reduced.

The method 300 further comprises controlling S314 the local distribution system's outtake of heat from the distribution grid based on the temporary steering temperature.

The method 300 may further comprise determining the return temperature of the return of heat transfer fluid in the local distribution system over time, and gradually decreasing the temporary steering temperature while securing that the temporary steering temperature is greater than the return temperature, until the temporary steering temperature reaches the reduced steering temperature.

The act of gradually decreasing the temporary steering temperature may comprise over time determining the return temperature, and in response to the determined return temperature reaching the temporary steering temperature: determining the return temperature of the return of heat transfer fluid in the local distribution system, and determining a new temporary steering temperature being higher than the determined return temperature and lower than the previous temporary steering temperature.

If the reduced steering temperature is not lower than the return temperature, the local control unit 140 may not adapt the reduced steering temperature. For such a case the method comprises controlling the local distribution system's outtake of heat from the distribution grid based on the reduced steering temperature. Such a controlling is performed until a new base steering temperature is determined or a new control signal is received.

A method 400 for controlling a local distribution system's outtake of cold from a thermal energy distribution grid is described with reference to FIG. 4.

The method 400 comprises determining S402 a base steering temperature for the local distribution system's outtake of cold from the thermal energy distribution grid. The base steering temperature is a temperature controlling the distribution system's 150 outtake of cold from the thermal energy distribution grid 110. The base steering temperature may be a set-point temperature for the heat transfer fluid. The base steering temperature may be determined based on a temperature measured in and/or in vicinity to the building to which the cold is provided. For example, the local control unit 140 may determine a temperature $T_{mes}$. $T_{mes}$ may be determined outside of the building with which it is associated. Alternatively, $T_{mes}$ may be determined inside the building. Alternatively, the base steering temperature may be determined based on a temperature measured inside the building and a temperature measured outside the building.

The method 400 further comprises receiving S404 a control signal indicative of increasing the steering temperature for the local distribution system's outtake of cold from the thermal energy distribution grid. The control signal is received at the local distribution system, preferably by the local control unit 140. The control signal may, for example, be a temperature offset. The offset may be an actual temperature value with which the local control unit should regulate the outtake from the thermal energy distribution grid. The actual value may be a positive or negative value. The offset may be a percentage value to be applied to the current or calculated outtake. The offset may be determined according to the inertia of each building combined with the need to steer their aggregated need of effect connected to production units. Larger offset to handle larger steering needs and smaller offset to handle smaller steering needs.

The method 400 further comprises determining S306 an increased steering temperature for the local distribution system's outtake of cold from the thermal energy distribution grid. The increased steering temperature is determined based on the control signal and the base steering temperature. As mentioned above, the control signal is preferably received at the local control unit 140. The local control unit 140 may adjust the associated local distribution system's 150 outtake of cold from the thermal energy distribution grid 110 based on the control signal. For example, the local control unit 140 may regulate the base steering temperature based on an offset received via the control signal. If the control signal indicates a temperature value, the local control unit 140 may apply the value on the steering temperature, or if the control signal indicates a percentage value the local control unit 140 may apply the percentage on the steering temperature. For example, the offset may be added or subtracted from the base steering temperature. The local control unit 140 may thereby determine S306 an increased steering temperature. The increased steering temperature may be used until another control signal is received. The outtake of the local distribution system 150 may be regulated accordingly.

The method 400 further comprises determining S408 a return temperature of the heat transfer fluid in the return of the local distribution system. Hence, the return temperature of a return of heat transfer fluid in the local distribution system 150 is determined.

The method 400 further comprises checking S410 if the determined reduced steering temperature is higher than the return temperature. Upon the determined reduced steering temperature being higher than the return temperature, the method further comprises determining S412 a temporary steering temperature being lower than the return temperature and higher than the base steering temperature. Hence, when cold is taken out from the thermal energy distribution grid 110, the local control unit 140 may be configured to check S410 if the determined increased steering temperature is higher than the return temperature. If the increased steering temperature is higher than the return temperature, the local control unit 140 may be configured to determine S412 a temporary steering temperature that is lower than the return temperature and higher than the base steering temperature. Thereby the local distribution system's 150 outtake of cold may be reduced.

The method 400 further comprises controlling S414 the local distribution system's outtake of heat from the distribution grid based on the temporary steering temperature.

The method 400 may further comprise determining the return temperature of the return of heat transfer fluid in the local distribution system over time, and gradually increasing the temporary steering temperature while securing that the temporary steering temperature is lower than the return temperature, until the temporary steering temperature reaches the increased steering temperature.

The act of gradually increasing the temporary steering temperature may comprise over time determining the return temperature, and in response to the determined return temperature reaching the temporary steering temperature: determining the return temperature of the return of heat transfer fluid in the local distribution system, and determining a new temporary steering temperature being lower than the determined return temperature and higher than the previous temporary steering temperature.

If the increased steering temperature is not higher than the return temperature, the local control unit 140 may not adapt the increased steering temperature. For such a case the method comprises controlling the local distribution system's outtake of cold from the distribution grid based on the increased steering temperature. Such a controlling is performed until a new base steering temperature is determined or a new control signal is received.

Figure 5A:
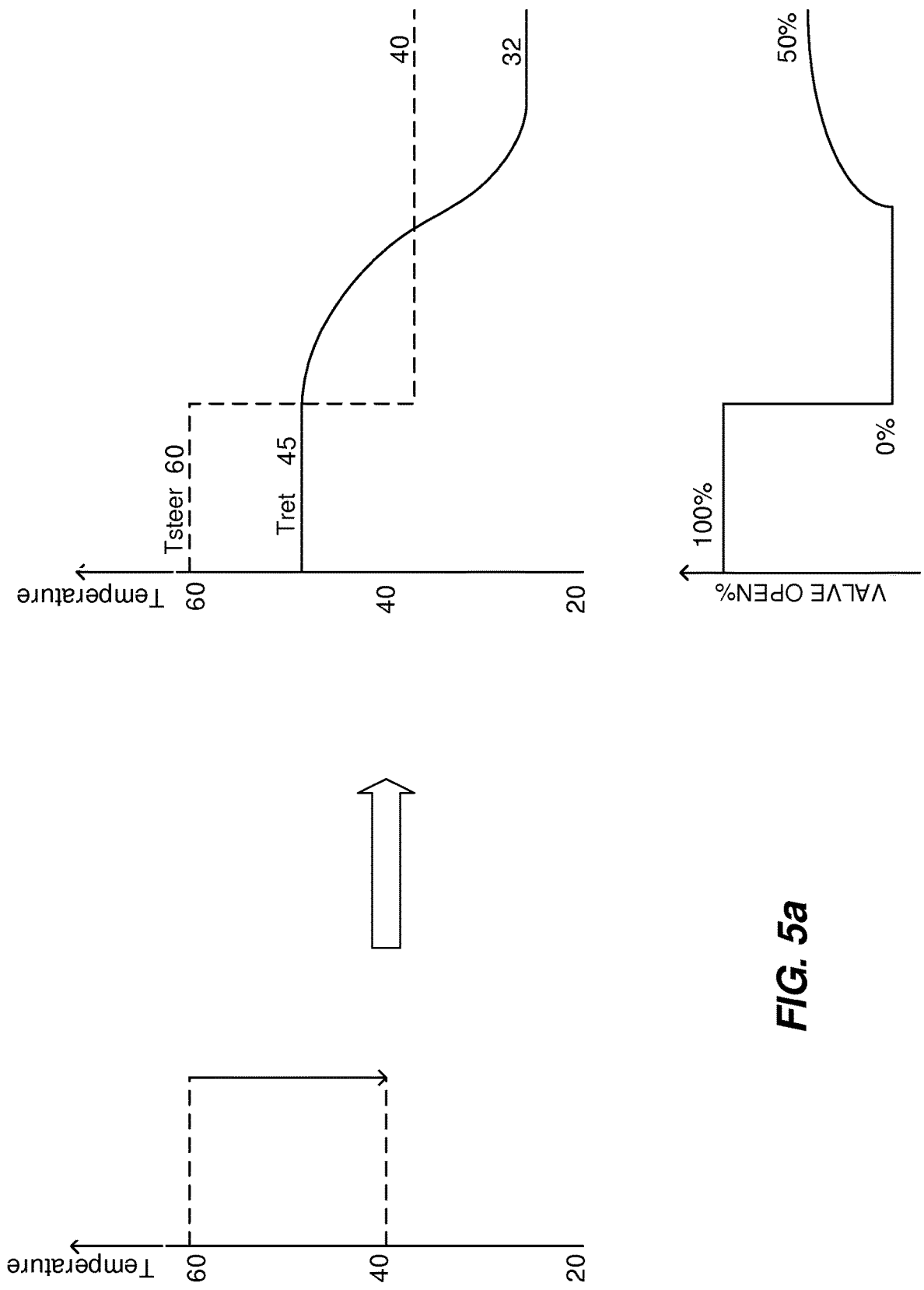
FIG. 5a and FIG. 5b are illustrations of the effects of changing a temporary steering temperature.
Figure 5B:
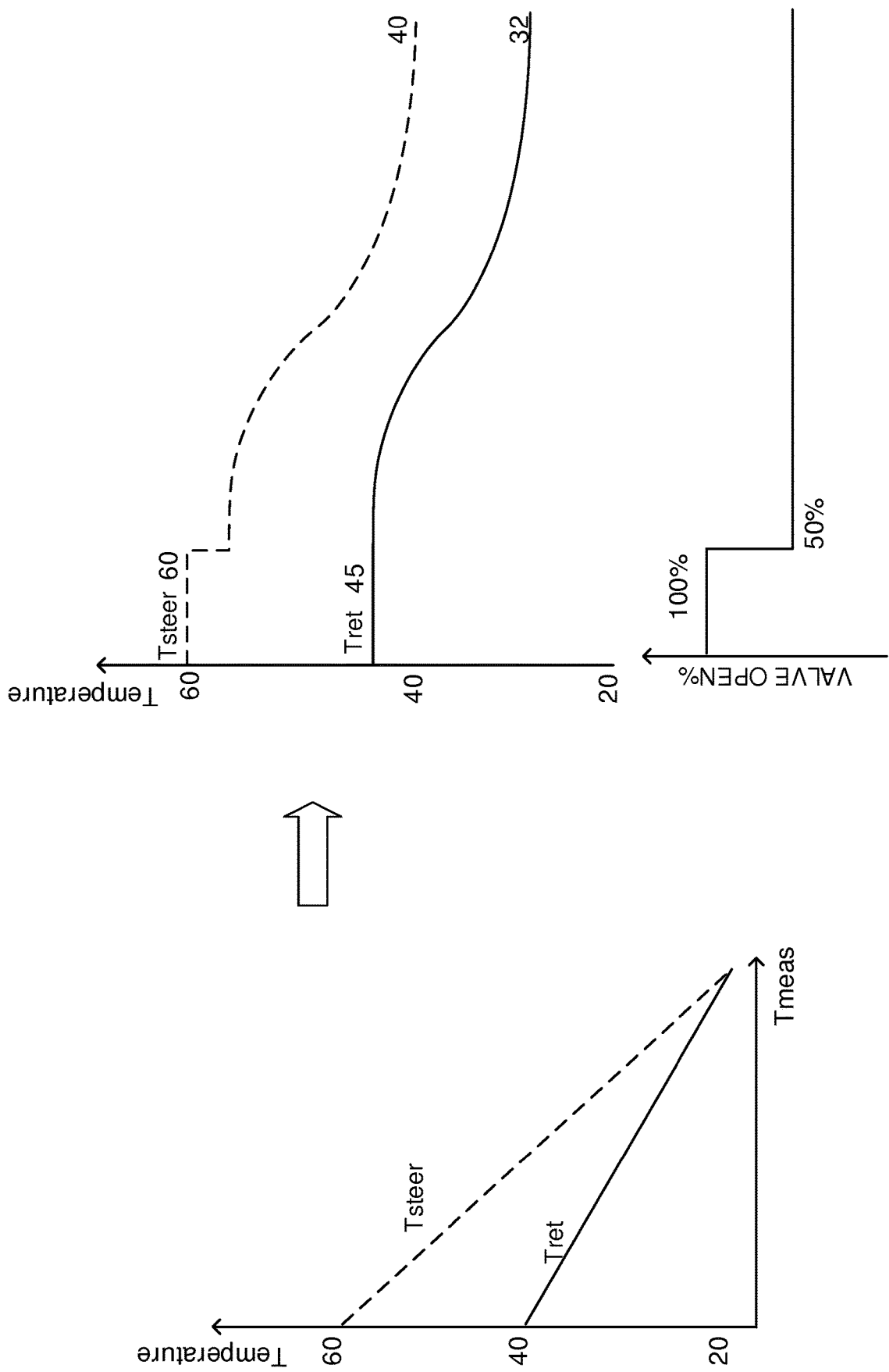

FIGS. 5a and 5b illustrates the effects of changing a steering temperature for a local distribution system.

An effect of a trivial solution for setting the steering temperature is shown in FIG. 5a. The local control unit may have determined a base steering temperature, which in this example is 60 degrees (as seen in the first graph). The local control unit may receive a control signal indicating a decrease in the steering temperature, in this example a decrease of 50% or 20 degrees. The local control unit may then determine a reduced steering temperature of 40 degrees. The return temperature in the local distribution system is higher than the reduced steering temperature, so no more heat should be transported into the system. This causes the valve to close completely for an unknown period of time until the return temperature is lower than the steering temperature, i.e. more heat is needed in the system. At this point the valve may be opened again to maintain the current outtake, based on the return temperature being less than the reduced steering temperature of 40 degrees.

An example of the effect of the method for determining a temporary steering temperature according to the present disclosure is shown in FIG. 5b. In this example the local control unit receives a control signal indicating a decrease of 50% of 20 degrees in the steering signal. The local control unit may determine a reduce steering temperature of 40 degrees. In contrast to the previous example, the local control unit may then determine a temporary steering signal that is lower than $T_{steer}$ and higher than $T_{ret}$. As shown in FIG. 5b the temporary steering temperature may be gradually decreased such that the difference between the temporary steering temperature and the return temperature is kept constant, or approximately constant, until the steering temperature reaches the desired level. The difference may be determined such that the temporary steering temperature is not lower than the return temperature. When the return temperature decreases, the local control unit may determine a new temporary steering temperature based on the determined difference.

The temporary steering temperature and the difference between the temporary steering temperature and the return temperature may be determined as follows. The energy outtake E is proportional to the flow and the temperature difference, $\Delta T$, between the steering temperature $T_{steer}$ and the return temperature $T_{ret}$, the density of the fluid and the heat capacity of the fluid. The local control unit may assume that the flow, the density and the heat capacity are constant. By dividing the current energy consumption (unknown) with the wanted energy consumption (unknown) the energy difference in percent may be expressed in $\Delta T$:

$$E\% = \Delta T_{target}/\Delta T_{current}$$

For illustrative purposes only, assuming that the current steering temperature is 60, the current return temperature is 45, and the control signal indicates a decrease by 50%:

$$E\% = 50\% = \Delta T_{target}/\Delta T_{current} = \Delta T_{target}/(60-45) \Leftrightarrow \Delta T_{target} = 50\%*(60-45) = 7.5$$

Hence, in this example, the difference between the steering temperature and the return temperature may be kept constant at 7.5 degrees, i.e. at the target difference.

It is contemplated that there are numerous modifications of the embodiments described herein, which are still within the scope of the invention as defined by the appended claims. For instance, the steps of the method may further be performed in a different order, where some steps are performed in parallel.

The invention claimed is:

1. A method for controlling a local distribution system's outtake of heat from a thermal energy distribution grid, wherein the local distribution system comprises:
   a device for exchange of thermal energy between the local distribution system and the thermal energy distribution grid,
   one or more thermal energy distribution devices,
   a feed for feeding the one or more thermal energy distribution devices with thermal energy from the device for exchange of thermal energy by conducting a heat transfer fluid, and
   a return for returning the heat transfer fluid from the one or more thermal energy distribution devices to the device for exchange of thermal energy, the method comprising:
   determining a base steering temperature for the local distribution system's outtake of heat from the thermal energy distribution grid;
   receiving, at the local distribution system, a control signal indicative of reducing a steering temperature for the local distribution system's outtake of heat from the thermal energy distribution grid;
   determining a reduced steering temperature for the local distribution system's outtake of heat from the thermal energy distribution grid based on the control signal and the base steering temperature;
   determining a return temperature of the heat transfer fluid in the return,
   upon the determined reduced steering temperature being lower than the return temperature, determining a temporary steering temperature being higher than the return temperature and lower than the base steering temperature; and controlling the local distribution system's outtake of heat from the thermal energy distribution grid based on the temporary steering temperature.

2. The method according to claim 1, further comprising: over time determining the return temperature, and
gradually decreasing the temporary steering temperature while maintaining the temporary steering temperature greater than the return temperature, until the temporary steering temperature reaches the reduced steering temperature.

3. The method according to claim 2, wherein the gradually decreasing of the temporary steering temperature comprises:
until the temporary steering temperature reaches the reduced steering temperature,
over time determining the return temperature, and
in response to the determined return temperature reaching the temporary steering temperature,
determining the return temperature of the return of heat transfer fluid in the local distribution system, and
determining a new temporary steering temperature being higher than the determined return temperature and lower than a previous temporary steering temperature.

4. The method according to claim 1, further comprising;
determining a temperature outside a building in which the local distribution system is arranged;
wherein the determining of the base steering temperature for the local distribution system's outtake of heat from the thermal energy distribution grid is based on the determined temperature outside the building.

5. The method according to claim 1, further comprising:
over time determining the return temperature, and
gradually increasing the temporary steering temperature while maintaining the temporary steering temperature lower than the return temperature, until the temporary steering temperature reaches an increased steering temperature.

6. The method according to claim 2, wherein gradually increasing of the temporary steering temperature comprises:
until the temporary steering temperature reaches an increased steering temperature,
over time determining the return temperature, and
in response to the determined return temperature reaching the temporary steering temperature,
determining the return temperature of the return of heat transfer fluid in the local distribution system, and
determining a new temporary steering temperature being lower than the determined return temperature and higher than a previous temporary steering temperature.

7. The method according to claim 1, further comprising:
determining a temperature inside a building in which the local distribution system is arranged;
wherein the determining of the base steering temperature for the local distribution system's outtake of cold from the thermal energy distribution grid is based on the determined temperature outside the building.

8. A controller to control a local distribution system's outtake of heat from a thermal energy distribution grid, wherein the local distribution system comprises a device for exchange of thermal energy between the local distribution system and the thermal energy distribution grid, one or more thermal energy distribution devices, a feed for feeding the one or more thermal energy distribution devices with thermal energy from the device for exchange of thermal energy by conducting a heat transfer fluid, and a return for returning the heat transfer fluid from the one or more diet mal energy distribution devices to the device for exchange of thermal energy, the controller comprising:
a first receiver configured to receive data pertaining to a base steering temperature for the local distribution system's outtake of heat from the thermal energy distribution grid;
a second receiver configured to receive a control signal indicative of reducing a steering temperature for the local distribution system's outtake of heat from the thermal energy distribution grid;
a third receiver configured to receive data pertaining to a return temperature of the heat transfer fluid in the return; and
a steering temperature controller to control the steering temperature for the local distribution system's outtake of heat from the thermal energy distribution grid as the steering temperature controller is configured to:
determine a reduced steering temperature for the local distribution system's outtake of heat from the thermal energy distribution grid based on the control signal and the base steering temperature,
compare the reduced steering temperature and the return temperature,
upon the determined reduced steering temperature being lower than the return temperature, determine a temporary steering temperature being higher than the return temperature and lower than the base steering temperature,
set the temporary steering temperature as the steering temperature for the local distribution system's outtake of heat from the thermal energy distribution grid, and
control the local distribution system's outtake of heat from the thermal energy distribution grid based on the temporary steering temperature.

* * * * *